United States Patent
Brock et al.

(10) Patent No.: US 7,209,324 B2
(45) Date of Patent: Apr. 24, 2007

(54) SLIDERS BONDED BY A DEBONDABLE ENCAPSULANT CONTAINING STYRENE AND BUTADIENE POLYMERS

(75) Inventors: Phillip J. Brock, Sunnyvale, CA (US); Michael W. Chaw, San Jose, CA (US); Dan J. Dawson, San Jose, CA (US); Craig J. Hawker, Los Gatos, CA (US); James L. Hedrick, Pleasanton, CA (US); Teddie P. Magbitang, San Jose, CA (US); Dennis R. McKean, Milpitas, CA (US); Robert D. Miller, San Jose, CA (US); Richard I. Palmisano, San Martin, CA (US); Willi Volksen, San Jose, CA (US)

(73) Assignee: Hitachi Global Storage Netherlands, B.V., Amsterdam (NL)

( * ) Notice: Subject to any disclaimer, the term of this patent is extended or adjusted under 35 U.S.C. 154(b) by 0 days.

(21) Appl. No.: 10/611,673

(22) Filed: Jun. 30, 2003

(65) Prior Publication Data
US 2004/0264050 A1    Dec. 30, 2004

(51) Int. Cl.
*G11B 5/60* (2006.01)

(52) U.S. Cl. .................................. 360/243.3
(58) Field of Classification Search ............... 360/324, 360/243.3; 29/603.12; 428/189; 216/22; 523/201, 513; 525/244
See application file for complete search history.

(56) References Cited

U.S. PATENT DOCUMENTS

| | | | |
|---|---|---|---|
| 3,970,723 A * | 7/1976 | Mees et al. ................. 525/244 |
| 5,475,040 A * | 12/1995 | Jamison et al. ............. 523/513 |
| 5,920,978 A | 7/1999 | Koshikawa et al. |
| 5,932,113 A | 8/1999 | Kurdi et al. |
| 6,088,908 A | 7/2000 | Imamura et al. |
| 6,091,582 A | 7/2000 | Komuro et al. |
| 6,106,736 A | 8/2000 | LeVan et al. |
| 6,249,402 B1 | 6/2001 | Katayama |
| 6,287,475 B1 * | 9/2001 | Fukushima et al. .......... 216/22 |
| 2001/0027603 A1 | 10/2001 | Komuro et al. |
| 2001/0036045 A1 | 11/2001 | Kondo |
| 2004/0087681 A1 * | 5/2004 | Shah ......................... 523/201 |
| 2004/0093719 A1 * | 5/2004 | Dai et al. ................ 29/603.12 |
| 2004/0265545 A1 * | 12/2004 | McKean et al. ............ 428/189 |
| 2005/0067373 A1 * | 3/2005 | Brock et al. .................. 216/22 |
| 2005/0068680 A1 * | 3/2005 | Buchan et al. ............. 360/234 |

* cited by examiner

*Primary Examiner*—Tianjie Chen
(74) *Attorney, Agent, or Firm*—Mintz, Levin, Cohn, Ferris, Glovsky and Popeo, P.C.

(57) ABSTRACT

The invention relates generally to the bonding of one or more sliders in styrene and butadiene polymers. More particularly, the invention relates to planarized slider assemblies formed by using debondable solid encapsulants comprised of styrene and butadiene polymers. The invention also relates to methods that use such encapsulants in conjunction with resists to produce magnetic head sliders having patterned air-bearing surfaces.

17 Claims, 6 Drawing Sheets

SLIDERS BONDED BY A DEBONDABLE ENCAPSULANT CONTAINING STYRENE AND BUTADIENE POLYMERS

TECHNICAL FIELD

The invention relates generally to the bonding of one or more sliders in styrene and butadiene polymers. More particularly, the invention relates to planarized slider assemblies formed by using debondable solid encapsulants comprised of styrene and butadiene polymers. The invention also relates to methods that use such encapsulants in conjunction with resists to produce magnetic head sliders having patterned air-bearing surfaces.

BACKGROUND

A magnetic storage system typically includes one or more magnetic recording disks having surfaces from which data may be read and to which data may be written by a read/write transducer or "head." The transducer is supported by an air-bearing slider that has a top surface attached to an actuator assembly via a suspension, and a bottom surface having an air-bearing design of a desired configuration to provide favorable flying height characteristics. As a disk begins to rotate, air enters the leading edge of the slider and flows in the direction of the trailing edge of the slider. The flow of air generates a positive pressure on the air-bearing surface of the slider to lift the slider above the recording surface. As the spindle motor reaches the operating RPM, the slider is maintained at a nominal flying height over the recording surface by a cushion of air. Then, as the spindle motor spins down, the flying height of the slider drops.

The manner in which a slider is manufactured can affect flying height. Preferably, variations in the physical characteristics of the slider, e.g., those due to manufacturing tolerances, should not substantially alter the flying height of the slider. If this result is not achieved, the slider's nominal flying height must be increased to compensate for variations between sliders.

A number of technologies may be employed to pattern such slider surfaces. For example, mechanical processes such as cutting or abrading, have been proposed to remove material from a slider surface. Similarly, non-mechanical processes such as laser ablation, in which high intensity light is used to evaporate material from sliders, have also been proposed. Alternatively, material may be added to slider surfaces to alter their configuration to provide favorable flying height characteristics. In some instances, these technologies have been used in conjunction with photolithographic and other semiconductor processing techniques. In addition, these technologies may be adapted to pattern a plurality of air-bearing slider surfaces simultaneously and/or systematically.

Thus, a number of approaches have been developed to facilitate the handling of a plurality of sliders for simultaneous and/or systematic patterning of their air-bearing surfaces. For example, U.S. Pat. No. 5,932,113 to Kurdi et al. describes a method for preparing the air-bearing surface of a slider for etch patterning. The method involves applying first and second thin films comprising, respectively, first and second air-bearing surfaces, to a carrier in a manner such that the first and second thin film are separated by a recess. An adhesive film is applied over the first and second thin films adjacent to the first and second air-bearing surfaces. Then, a curable acrylate adhesive fluid is deposited in the recess and held therein by the adhesive film. Once the fluid is cured, the adhesive film is removed. The resulting slider assembly may then be patterned by etching. For example, the first and second air-bearing surfaces may be coated with an etch mask, which is then developed to allow for the patterning of the first and second air-bearing surfaces.

Similarly, U.S. Pat. No. 6,106,736 to LeVan et al. describes a method of preparing an air-bearing surface of a slider for etch patterning. The method involves applying first and second sliders, each comprising an air-bearing surface, to a substrate, such that the sliders are separated by a recess and the air-bearing surfaces are exposed. The substrate is placed into a frame, and a contiguous adhesive film is applied across the substrate and frame and positioned adjacent to the air-bearing surfaces. Subsequently, a heated wax is deposited in the recess and cooled, and the adhesive film is removed.

In short, these approaches employ an encapsulant to fill the gaps between sliders to protect the edges of the sliders during patterning. However, these encapsulants suffer from a number of disadvantages. For example, the curable encapsulants described in Kurdi et al. and the waxes described in LeVan et al. often exhibit unfavorable bonding and/or debonding performance. In particular, cured epoxy materials, e.g., pure thermosetting epoxy resins, can be removed from sliders only with great difficulty and often leave significant material residue on the slider surfaces. In addition, the prior art encapsulants suffer from incompatibility with solvents that are used with the photolithographic techniques for patterning air-bearing surfaces. That is, the prior art encapsulants are mechanically unstable and are subject to solvation when exposed to fluids used in photolithographic techniques.

Thus, there is a need in the art to overcome the disadvantages associated with prior art encapsulants. This has been accomplished by the instant invention, which provides for improved slider assemblies and methods for patterning air-bearing surfaces of sliders using debondable encapsulants.

SUMMARY OF THE INVENTION

Accordingly, one aspect of the invention relates to a slider assembly formed using a debondable solid encapsulant comprising styrene and butadiene polymers.

Another aspect of the invention pertains to a method for forming such slider assemblies.

Yet another aspect of the invention provides methods for using a debondable solid encapsulant comprising styrene and butadiene polymers to pattern an air-bearing surface of a slider.

Additional aspects, advantages and novel features of the invention will be set forth in part in the description that follows, and in part will become apparent to those skilled in the art upon examination of the following, or may be learned by practice of the invention through routine experimentation.

In a first embodiment, the present invention provides a slider assembly comprising a plurality of sliders bonded by a debondable solid encapsulant. The encapsulant is comprised of styrene and butadiene polymers. Each slider has a surface that is free from the encapsulant, and the encapsulant-free surfaces are coplanar to each other.

Typically, the slider assembly has a contiguous planar surface comprised of at least one encapsulant region and containing the coplanar slider surfaces. In addition, the sliders may be arranged in an array, e.g., rectilinear array, such that the sliders do not contact each other. The coplanar surfaces of the sliders may be air-bearing surfaces.

In another embodiment, the invention provides a method for forming a slider assembly. The method involves arrange a plurality of sliders each having a surface such that the surfaces are coplanar to each other. An encapsulant fluid comprising styrene and butadiene moieties is dispensed in a manner effective to bond the sliders without contacting the coplanar slider surfaces, and the dispensed encapsulant fluid is subjected to conditions effective for the fluid to form a debondable solid encapsulant comprising a styrene and butadiene polymers.

Typically, sliders are arranged on a laminate of a flexible tape and an adhesive such that slider surfaces contact the adhesive. In such a case, the adhesive is preferably resistant and optimally impervious to solvation by the encapsulant fluid.

In a further embodiment, the invention provides a method for patterning an air-bearing surface of a slider. A resist layer is applied on an air-bearing surface of a slider such that at least a portion of the slider other than the air-bearing surface is encapsulated in a debondable solid encapsulant comprising styrene and butadiene polymers. A portion of the resist layer is removed to uncover a portion of the air-bearing surface in a patternwise manner. Material may be added to, or more typically, removed from the uncovered portion of the air-bearing surface. As a result, the air-bearing surface of the slider is patterned. The encapsulant is mechanically stable upon exposure to any fluid employed to effect patterning of the air-bearing surface.

BRIEF DESCRIPTION OF THE FIGURES

FIGS. 2A and 2B depict the arrangement of sliders in a rectilinear array on a substrate in the form of a tape having a pressure-sensitive adhesive coated on an upper surface thereof in top view. FIG. 2B depicts the arrangement of sliders of FIG. 2A in cross-sectional view along dotted line A. FIGS. 2C and 2D depict the formation of an encapsulated array in top and cross-sectional views, respectively. FIGS. 2E and 2F depict the encapsulated array of FIGS. 2C and 2D attached to a carrier and having the tape removed in top and cross-sectional views, respectively.

FIG. 3A depicts in cross-sectional view the application of a photoresist layer on the air-bearing surface of the slider assembly. FIG. 3B depicts in cross-sectional view the patternwise exposure of the photoresist layer. FIG. 3C depicts in cross-sectional view the removal of the resist layer according to the pattern formed in FIG. 3B. FIG. 3D depicts in cross-sectional view the removal of material from the exposed slider surfaces. FIG. 3E depicts in top view debonded sliders having patterned air-bearing surfaces.

DETAILED DESCRIPTION OF THE INVENTION

Definitions and Overview

Figure 1:
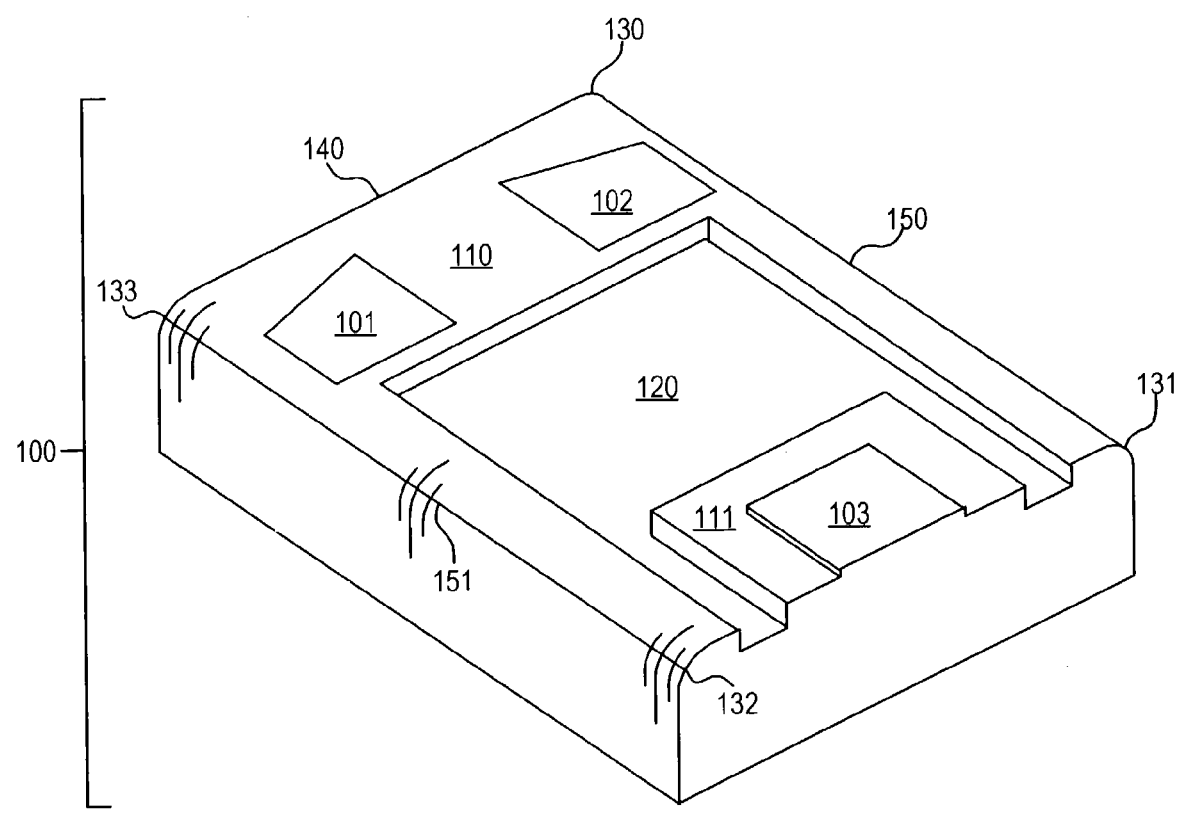
FIG. 1 schematically illustrates a prior art slider having rounded corners and edges.

Before describing the present invention in detail, it is to be understood that this invention is not limited to processing conditions, manufacturing equipment, or the like, as such may vary. It is also to be understood that the terminology used herein is for describing particular embodiments only and is not intended to be limiting.

It must be noted that, as used in the specification and the appended claims, the singular forms "a," "an" and "the" include plural referents unless the context clearly dictates otherwise. Thus, for example, reference to "a resist layer" includes a single resist layer as well as a plurality of resist layers, reference to "a slider" includes a single slider as well as a plurality of sliders, and the like.

In describing and claiming the present invention, the following terminology is used in accordance with the definitions set out below.

The term "array" as used herein refers to a two-dimensional arrangement of items such as an arrangement of sliders. Arrays are generally comprised of regular, ordered items as in, for example, a rectilinear grid, parallel stripes, spirals, and the like, but non-ordered arrays may be advantageously used as well. In particular, the term "rectilinear array" as used herein refers to an array that has rows and columns of items wherein the rows and columns typically, but not necessarily, intersect each other at a ninety-degree angle. An array is distinguished from the more general term "pattern" in that patterns do not necessarily contain regular and ordered features.

The term "bond" is used herein in its ordinary sense and means to join securely. Typically, but not necessarily, "bonding" is achieved through adhesive forces. Similarly, the term "debondable" as in "debondable encapsulant" refers to an encapsulant that is susceptible to complete removal from the surfaces of items bonded thereby without damage to the items.

The term "encapsulant" refers to a material suited to bond a plurality of items or to encase one or more items in a confined space. Typically, an "encapsulant" is a solid material formed from an "encapsulant fluid" that has been subjected to conditions effective for solidification to occur.

The term "fluid" is generally used in its ordinary sense and refers to matter that is capable of flow. Typically, but not necessarily, a fluid contains a liquid and optionally a solid or a gas that is minimally, partially, or fully solvated, dispersed, or suspended in the liquid. For example, a fluid may be aqueous or nonaqueous in nature and may contain organic solvents and the like having polymers and/or monomers solvated therein.

"Optional" or "optionally" means that the subsequently described circumstance may or may not occur, so that the description includes instances where the circumstance occurs and instances where it does not.

The term "polymer" is used herein in its conventional sense to refer to a compound having two or more monomer units, and is intended to encompass homopolymers as well as copolymers, including, for example, graft copolymers. The term encompasses polymers of all types and is not limited to linear, branched, cyclic, or crosslinked polymers. Thus, for example, a styrene polymer contains at least one monomeric unit having a styrene structure, an acrylate polymer contains at least one monomeric unit having an acrylate structure, and a butadiene polymer contains at least one monomeric unit having a butadiene structure.

The term "solid" is used in its ordinary sense and refers to items that have definite shape and volume.

The term "substantially" as in, for example, the phrase "substantially identical in geometric dimensions" refers to items having dimensions that that do not deviate from each other by more than about 10%. Preferably, the difference in the dimensions is no more than 1%. Optimally the difference is no more than 0.1%. Other uses of the term "substantially" involve an analogous definition.

Slider Assembly

Generally, the invention relates to the patterning of an air-bearing surface of a slider. Accordingly, various embodiments of the invention provide slider assemblies that may be used in conjunction with such surface patterning processes. In order to elucidate the invention fully, a known slider is illustrated in FIG. 1. As with all figures referenced herein, in which like parts are referenced by like numerals, FIG. 1 is not to scale, and certain dimensions may be exaggerated for clarity of presentation. A slider 100 having a generally rectangular air-bearing surface is depicted in FIG. 1. Located on the air-bearing surface of slider 100 are leading pads 101 and 102 disposed on a first shallow step region 110. Additionally, the slider 100 includes a trailing pad 103 disposed on a second shallow step region 111. The shallow step regions 110 and 111 are approximately the same depth with respect to the air-bearing surface.

The shallow step region 110 extends along the leading edge 140 of slider 100 and has side rails that extend along the side edges 150 and 151 of slider 100. The shallow step regions 110 and 111 provide the positive pressure regions of slider 100. More specifically, the shallow step region 110 pressurizes leading pads 101 and 102 and shallow step region 111 pressurizes trailing pad 103 during operation, to give slider 100 a positive lift. Pressurization mainly occurs at the step transition between the shallow step regions and the air-bearing pads. The negative pressure region 120 is responsible for pulling slider 100 towards the disk surface during operation. During operation, the disk is rotating and the slider is flying above the disk surface. In general, the negative and positive pressure regions of slider 100 are counterbalanced to provide a relatively flat flying height profile.

It should be evident from the slider depicted in FIG. 1 that the steps on the air-bearing surface must be patterned with sufficient precision to provide a desired flying height profile. Although the size of the sliders may vary, recent advances in slider processing technology allow for the production of sliders having a rectangular air-bearing surface area on the order of 1 mm$^2$ or less. Accordingly, there is an increasing demand for technologies that effect precise control over the placement and spatial orientation of slider surfaces when the surface is patterned.

To this end, the invention provides a slider assembly comprising a plurality of sliders. The sliders are bonded by a debondable solid encapsulant. Depending on the processing techniques that may be used in conjunction with the assembly, certain bonding materials are particularly suitable for use as encapsulants. Selection criteria for suitable encapsulant are discussed below.

The invention may be employed using sliders composed of any material suitable for use as a slider having appropriate thermal, electrical, magnetic and mechanical properties. Typically, sliders for magnetic heads are made from a hard material having a high modulus of elasticity. Such materials include ceramics such as carbides, nitrides, and oxides. Carbides such as aluminum carbide, silicon carbide, titanium carbide, boron carbide, germanium carbide, tungsten carbide, and mixed-metal carbides (e.g., AlTiC or $Al_2O_3TiC$) are generally preferred but other materials such as titanium oxide, silicon nitride and silicon may be used as well. In addition, it is preferred that the slider is sized to require only minimal material addition or removal in order to pattern the air-bearing surface.

Thus, sliders may be formed by first cutting a monolithic solid member into the plurality of sliders. The monolithic solid member may be grown or prepared in bulk, and depending on desired properties, the material may have a single crystalline, multicrystalline, or amorphous microstructure. Exemplary techniques for forming monolithic materials include Czochralski, float zone and other methods known in the art.

Irrespective of the encapsulant employed to form the slider assembly, each slider of the assembly has a surface that is free from the encapsulant. These surfaces are coplanar to each other and typically represent air-bearing surfaces of the sliders. The coplanar arrangement of the slider surfaces is well suited for use in numerous surface-patterning techniques such as those involving the use of masking technology and/or the employment of photolithographic techniques. In some instances, the slider assembly has a contiguous planar surface comprised of at least one encapsulant region and containing the coplanar slider surfaces. Such planar surface contiguity facilitates the deposition of a uniform and/or contiguous film or coating on the coplanar slider surfaces. In some instances, the slider has an additional planar surface opposing the coplanar sliders surfaces. The additional planar surface may or may not be contiguous and may be formed from the encapsulant and/or a slider. Such an additional planar surface may further facilitate ease in the handling of the assembly.

In certain embodiments, the sliders of the assembly are substantially identical in geometric dimensions. In addition, the sliders are typically arranged in an array such that the distance between the sliders is minimized without having the sliders contact each other. Contact among the sliders increases the likelihood of slider damage. Often, rectilinear arrays are chosen to maximize the slider to encapsulant volumetric ratio.

The inventive slider assembly may be used as a convenient means for handling and processing a plurality of sliders. To ensure that the sliders remain immobilized with respect to each other, the encapsulant may be rigid. In addition or in the alternative, the slider assembly as described above may further include a carrier attached to the encapsulant and/or at least one slider. The carrier is particularly useful when the encapsulant is brittle or otherwise difficult to handle. Usually, the carrier does not cover any of the coplanar slider surfaces.

The encapsulant may be selected for certain properties that will facilitate its use in slider patterning techniques. While specific materials suitable for use as an encapsulant are discussed below, encapsulant materials generally share some common characteristics. As an initial matter, the encapsulant should be able to bond with the sliders in a void-free manner without debonding until after patterning processes have been completed. Because bonding behavior is often surface dependent, the encapsulant should be selected according to the surface to which bonding is to take place. Particular attention should be paid to factors such as surface composition, morphology, and the like.

In addition, the encapsulant should be able to maintain its mechanical stability until debonding is desired. Furthermore, the encapsulant should be readily debondable without damage to the sliders and without leaving any residue on the sliders. For example, the encapsulant may be debonded through washing in a solvent capable of solvating the encapsulant or a component thereof. In addition, or in the alterative, heat may be applied to liquefy, vaporize and/or discompose the encapsulant.

Thus, it should be evident that the encapsulant should be able to withstand the environmental conditions imposed on the sliders during patterning. For example, some slider patterning techniques require the exposure of sliders to a vacuum. Any outgassing from the encapsulant may compromise the quality of the vacuum. Thus, it is sometimes preferred that the encapsulant does not substantially outgas under vacuum. As another example, slider-patterning techniques may require thermal cycling of the sliders. Accordingly, it is preferred that the encapsulant be mechanically stable for thermal cycling, e.g., from about 20° C. to about 100° C.

Method for Forming a Slider Assembly

The invention also provides a method for forming a slider assembly. The method involves arranging a plurality of sliders each having a surface such that the surfaces are coplanar to each other. An encapsulant fluid is dispensed in a manner effective to bond the sliders without contacting the coplanar slider surfaces. The dispensed encapsulant fluid is subjected to conditions effective for the fluid to form a debondable solid encapsulant from the encapsulant fluid.

Due to the precision required for forming the slider assembly and the size associated with the sliders, manual slider placement is typically undesirable. Instead, automated and/or robotic means for positioning or arrange the sliders may be preferred. Selection of an appropriate means for positioning or arranging the sliders depends on the speed and accuracy required. In some instances, the sliders may be placed simultaneously. In other instances, the sliders may be successively placed. One of ordinary skill in the art will recognize that positioning means, may be constructed from, for example, motors, levers, pulleys, gears, a combination thereof, or other electromechanical or mechanical means.

In order to maintain the sliders in proper position and spatial orientation to allow for solidification of the encapsulant to occur, a means for immobilizing the sliders may be employed. For example, the sliders may be arranged on a substrate surface and immobilized thereon through mechanical action (e.g., clips, centripetal force), electrostatic attraction, magnetic forces, or other known immobilizing means. In some embodiments, the sliders may be temporarily immobilized on a substrate through the application or use of an adhesive on the substrate surface, e.g., pressure sensitive adhesives such as acrylics, natural rubbers, butyl rubbers, polyvinylethers, silicones, and mixtures thereof. As the performance of pressure adhesives may vary with temperature, an adhesive may be selected to exhibit improved performance at temperatures ranging from about 25° C. to 30° C. The pressure of application may range from about 10 lbs/cm$^2$ to 50 lbs/cm$^2$ and preferably is about 25 lbs/cm$^2$. To deter the adhesive from leaving residue on the slider, the adhesive should preferentially adhere to the substrate over the air-bearing surfaces.

As discussed above, the encapsulant fluid is dispensed in a manner effective to bond the sliders without contacting the coplanar slider surfaces. Thus, when the substrate surface is planar, the air-bearing surfaces of the sliders may be placed in contact with the substrate surface to ensure that the air-bearing surfaces remain coplanar as well as to deter contact with the encapsulant fluid. Any adhesive used should be resistant or impervious to solvation by the encapsulant fluid or a component thereof to deter wicking of the encapsulant fluid via the adhesive to contact the slider surfaces.

The substrate may be comprised of any material compatible with the encapsulant fluid. In addition, the substrate is preferably selected from a material that is softer than the slider to avoid damaging any slider surface that comes into contact therewith. In some instances, a flexible substrate may be used to facilitate its removal. For example, any number of polymeric films may be used such as those derived from monomers including ethylene, propylene, butylene and, homopolymers and copolymers of these olefins; vinyl monomers such as vinyl acetate, vinyl chloride, vinylidene chloride, vinyl fluoride, acrylonitrile, methyl methacrylate and mixtures thereof; of ethylene with portions of one or more unsaturated monomers such as vinyl acetate, acrylic acid and acrylic esters; as well as styrenes, carbonates, esters and urethanes. Polymers capable of withstanding relatively high temperatures, such as polyimide may be a desirable substrate material when the substrate may be exposed to a high temperature. Polyimides are commercially available, e.g., under the tradename Kapton®, from DuPont (Wilmington, Del.).

Thus, it should be apparent that the substrate may be a laminate of a flexible tape and an adhesive, wherein the adhesive is in contact with the air-bearing surfaces. Exemplary adhesive thicknesses may range from about 2 to about 25 micrometers and the tape thickness may range from about 12 to about 150 micrometers.

The adhesive strength of the adhesive film varies from about 50 gm/20 mm up to about 100 gm/20 mm. Commercially available adhesive films include V-8-S from Nitto Denko, which is a polyvinyl chloride based tape having a 10 micrometer thick adhesive layer, a 70 micrometer thick polyvinyl chloride flexible substrate and 100 g/20 mm of adhesion. Another film is the Nitto Denko V-8-T, having the same constitution as the V-8-S film with 50 gm/mm of adhesion.

Other useful films include Nitto Denko's BT-150E-EL film having 75 gm/20 mm of adhesion, an ethylene vinyl acetate based tape having a 15 micrometer thick adhesive layer; Lintec's Adwill P-1600 B film, which is a water flushable tape having a base material of polyolefin which is 110 micrometers thick, an adhesive layer of polyarylate which is 20 micrometers thick and has adhesion of 140 gm/25 mm. In some instances, polyesters such as polyethylene terephthalate may be used as a tape material. For example, substrates comprised of a laminate of a polyethyelene terephthalate tape having a thickness of about 37 micrometers and an adhesive layer of about 5 micrometers are available from 3M Corporation (St. Paul, Minn.).

As discussed above, the sliders are typically arranged in a rectilinear array on a planar substrate surface such that the distance between the sliders is minimized without having the sliders contact each other. As a result, gaps or recesses are formed between the rows and columns. The distance between the rows and columns may range from about 50 to about 1000 micrometers and can be as small as about 100 micrometers or less. The depth of the gaps depends upon the thicknesses of the sliders and may range from about 100 to about 300 micrometers. While the encapsulant fluid may be dispensed in any manner effective to bond the sliders without contacting the coplanar slider surfaces, encapsulant fluid should flow in certain ways to form certain embodiments of the slider assembly. For example, in order to form void-free slider assemblies, encapsulant fluid is preferably injected or drawn into the gaps or recesses between the rows and the columns. In addition, to form slider assemblies having a contiguous planar surface comprised of at least one encapsulant region and containing the coplanar slider surfaces, the encapsulant fluid preferably conforms to the slider surfaces and the planar substrate surface to which the fluid comes into contact. Furthermore by bringing the level of encapsulant fluid to the same or higher level as the sliders, an additional planar surface opposing the coplanar sliders surfaces may be formed. Molds and equivalents thereof may be advantageously used to confine encapsulant fluid flow.

The ability of the encapsulant fluid to gap-fill is dependent on a number of factors. One particularly important factor is the viscosity of the encapsulant fluid. Viscosity is a measure of resistance of a fluid to sheer forces and is often roughly inversely proportional to the gap-filling ability of the fluid. Typically, the encapsulant fluid has a low initial viscosity, e.g., less than about 1000 centistokes. Preferably, the initial viscosity is no more than about 800 centistokes. More preferably, the initial viscosity is no more than about 500 centistokes. For certain encapsulant fluids, an initial viscosity of about 20 to about 200 centistokes represents an optimal range for gap-filling ability. For encapsulant fluids that contain a solvent, a higher solvent content tends to correlate with lower viscosity. In some instances, an encapsulant fluid containing a polymer dissolved in a solvent exhibits a preferred viscosity at a solvent content of 30 wt % to about 50 wt %. An optimal viscosity may sometimes be found when the solvent is present in a range of about 40 wt % to about 45 wt % of the encapsulation fluid.

Surface forces may also play a role in determining the ability of the encapsulant fluid to gap-fill. In general, the ability of an encapsulant fluid to fill a gap will depend, in part, on the affinity of the surface of the gap to the encapsulant fluid. Thus, proper selection of the encapsulant fluid according to the surface properties of the substrate and/or the sliders may enhance gap filling via capillary action.

Once proper distribution of the encapsulant fluid is achieved, the dispensed encapsulant fluid is subjected to conditions effective for the fluid to form a debondable solid encapsulant from the encapsulant fluid. Depending on the encapsulant used, solidification may take place via a number of different mechanisms. For example, in situ crosslinking and/or polymerization may be effected in the encapsulant fluid. In some instances, such reactions may be photoinitiated. In addition, when the encapsulation fluid contains a polymer dissolved in a solvent, formation of a solid encapsulant may involve removing the solvent. This may be achieved by subjecting the encapsulation fluid to heat or reduced pressure.

In some instances, a combination of mechanisms may be employed. For example, a slider assembly may be formed in the manner as discussed above wherein the encapsulation fluid is comprised of a first polymer, a solvent, and a composition that is polymerizable and/or crosslinkable. Once dispensed, the solvent is evaporated to form a debondable solid encapsulant comprising the first polymer and a second polymer prepared via polymerization and/or crosslinking of the composition from the encapsulation fluid.

An example of the above-described method for forming the assembly is illustrated in FIG. 2. FIGS. 2A and 2B depict the placement of sliders 10 in a four-by-four rectilinear array on a tape 12 having a substantially planar upper surface 14. The upper surface 14 of the tape has a coating of a pressure-sensitive adhesive 16 coated on an upper surface thereof. Each slider has an air-bearing surface 18 and an opposing back surface 20. The air-bearing surfaces 18 are placed facing downward to face the upper surface 14 of the tape and to contact the pressure sensitive adhesive 16.

Also provided is a rectangular frame 21 in contact with the pressure sensitive adhesive 16. Together with the frame 21, the tape 12 serves as a mold or container to confine the encapsulant fluid dispensed thereon.

Figure 2A:
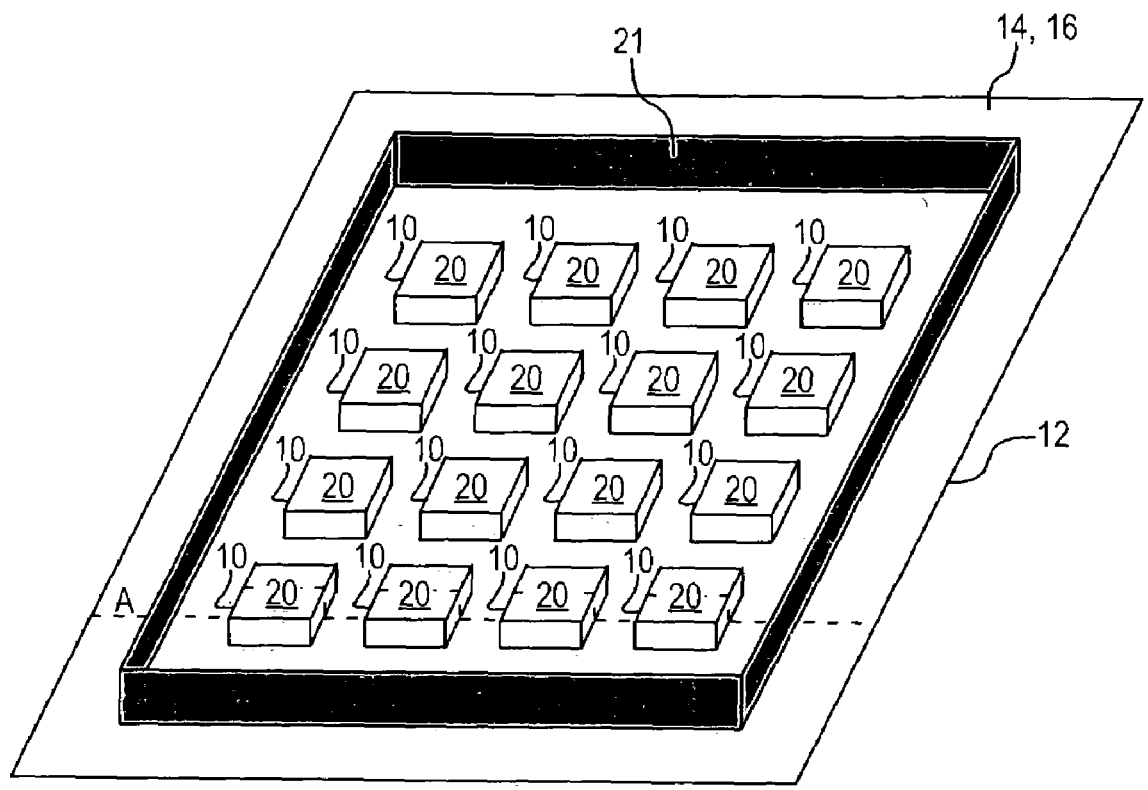
FIGS. 2A–2F, collectively referred to as FIG. 2, depict an example of the inventive slider assembly as well as a method for forming the assembly.
Figure 2B:
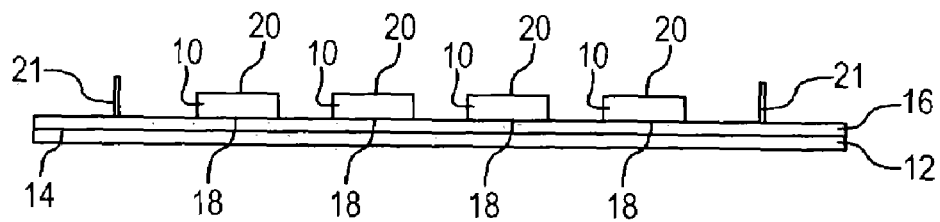
Figure 2C:
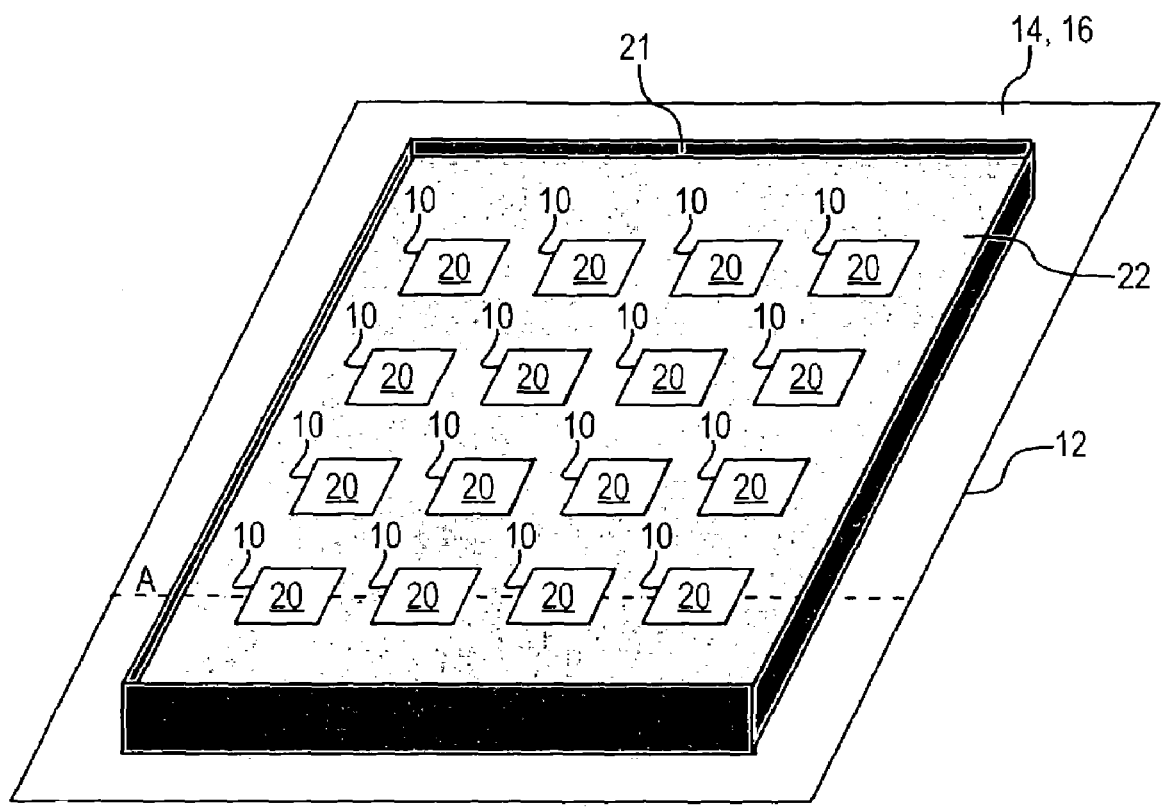
Figure 2D:
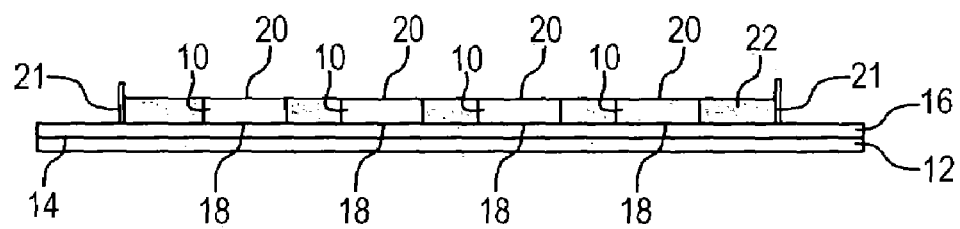

FIGS. 2C and 2D depict the formation of an encapsulated array. In general, FIGS. 2C and 2D are identical to FIGS. 2A and 2B, except that an encapsulant fluid 22 is dispensed on the tape 12 within the frame 21 to a level that coincides with the exposed surface 20 of the sliders 10. As depicted in FIG. 2D, the encapsulant fluid conforms to the sides of the sliders 10 as well as the profile of the upper surface 14 of the tape. In addition, no wicking of the encapsulant fluid 22 is shown between air-bearing surfaces 18 of the sliders 10 and the adhesive 16.

Figure 2E:
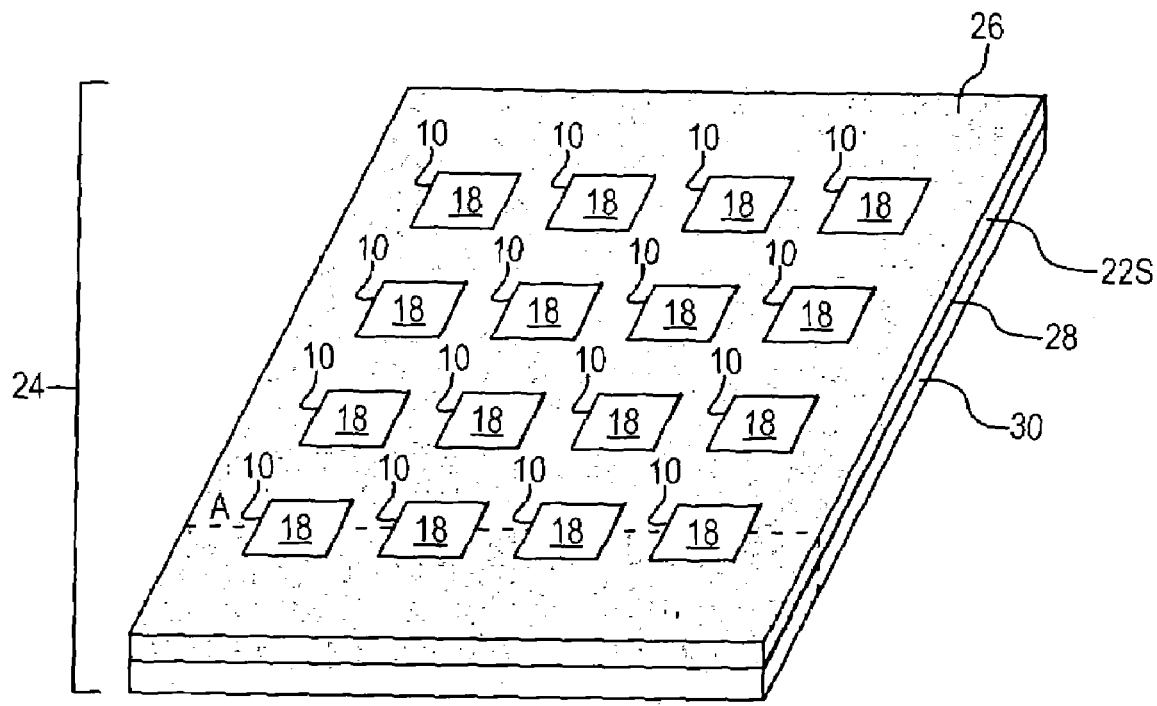
Figure 2F:
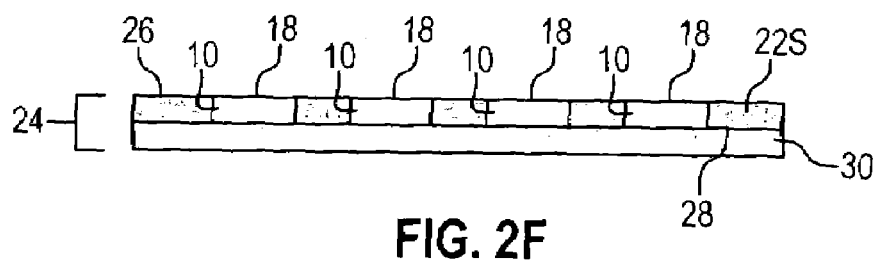

As depicted in FIGS. 2E and 2F, once the encapsulant fluid 22 solidifies to form the encapsulant 22S, the tape 12 may be removed to form the slider assembly 24. The slider assembly 24 has two opposing parallel planar surfaces indicated at 26 and 28. Surface 26 is formed in part by air-bearing surfaces 18 of the sliders 10, while surface 28 is formed in part by the back surfaces 20 of the sliders 10. A carrier 30 is attached to surface 28.

Method for Patterning an Air-bearing Surface of a Slider

The invention further provides a method for patterning an air-bearing surface of a slider. The method involves applying a resist layer on an air-bearing surface of a slider, wherein at least a portion of the slider other than the air-bearing surface is encapsulated in a debondable solid encapsulant comprising styrene and butadiene polymers. A portion of the resist layer is removed to uncover a portion of the air-bearing surface in a patternwise manner. In some instances, material is added to the uncovered portion of the air-bearing surface. In addition or in the alternative, material may be removed from the uncovered portion of the air-bearing surface. As a result, the air-bearing surface is patterned. Notably, the encapsulant is mechanically stable upon exposure to any fluid employed to apply the resist layer, to remove the resist layer, to add material to the air-bearing surface and/or to remove material from the air-bearing surface.

In general, the resist layer may be applied using any of a number of conventional techniques, e.g., sequential spin coating, casting, extruding or the like. For example, a resist composition may be provided in a liquid solvent on the substrate surface, and heated to remove the solvent. As a result, the resist layer typically has a thickness of about 1 to about 20 micrometers, optionally about 2 to about 10 micrometers. To effect controlled removal of portions of the resist layer, it is preferred that the resist layer be applied with a uniform thickness.

To facilitate the patternwise removal of a portion of the resist layer, the resist layer may be comprised of a photosensitive composition that has been exposed to photons in the patternwise manner. Photosensitive compositions are typically polymeric and exhibit different removal properties after exposure to electromagnetic radiation. For example, photosensitive compositions may exhibit increased mechanical integrity resulting from radiation-initiated crosslinking or decreased mechanical integrity resulting from radiation-initiated breakdown. Examples of photosensitive compositions include, but are not limited to, positive and negative resists that are responsive to photon or electron beams. Positive photoresist compositions are more easily removed after exposure to radiation. Positive photoresists may include polymeric materials with weak links that degrade by the process of scission or contain a photoactive component that renders the composition more soluble to a solvent upon irradiation. Negative photoresist compositions, on the other hand, become more difficult to remove after exposure to radiation.

Suitable photosensitive compositions such as photoresists may comprise, for example, poly(methyl methacrylate) ("PMMA") or copolymers thereof such as poly(methyl methacrylate-co-t-butylmethacrylate), a poly(lactide) such as poly(lactide-co-glycolide), polymethacrylamide, polyoxymethylene, polyalkenesulfone, or poly(glycidylmethacrylate-co-ethyl acrylate), epoxies, phenolics, polymers thereof, copolymers thereof, and combinations thereof. Photosensitive compositions may also contain photoactive compounds including, but not limited to, diazonaphthoquinones, iodonium and sulfonium salts and o-nitrobenzyl esters.

Typically, the resist is irradiated using photonic radiation, e.g., ultraviolet radiation and a mask to provide the desired pattern. Following exposure, the resist layer may be developed using a suitable solvent to remove the irradiated or the non-irradiated areas to uncover a portion of each slider surface. One of ordinary skill in the art will recognize that there are many commercially available photoresists having different exposure wavelengths, and that custom photoresist compositions may be formulated to have a particular exposure wavelength.

When one wishes to add material to the uncovered portion of the air-bearing surface, various techniques are known in the art of semiconductor fabrication. Exemplary techniques include, but are not limited to, evaporation, sputtering, chemical vapor deposition, and electroplating. Notably, deposition techniques must be chosen according to the material. For example, metals may be deposited by evaporation, sputtering, electroplating, chemical vapor deposition, etc.

In order to effect a high degree of control over the addition of material to the air-bearing surface, vacuum deposition technology is generally preferred. Such vacuum processes include, but are not limited to, cathodic arc physical vapor deposition, electron-beam evaporation, enhanced arc physical vapor deposition, chemical vapor deposition, magnetronic sputtering, molecular beam epitaxy, combinations of such techniques and a variety of other techniques known to one of ordinary skill in the art.

When one wishes to remove material from the air-bearing surface, an etchant may be used to effect chemical, mechanical and/or physical removal material. In some instances, an isotropic etchant may be used to remove material in a direction-invariant manner such that no difference is exhibited in directional etching rate. Alternatively, an anisotropic etchant may be used to remove material preferentially in a particular direction, e.g., according to crystallographic orientation of the solid body or the direction of the light energy particles for light assisted etching. In some instances, an ionized gas such as argon-based or fluorine-based plasma or an ion beam may be used as an etchant. A liquid etchant may also be advantageously used as well.

Further information regarding patterning and etching processes using lithographic techniques is provided in Sze (1983), "Lithography," VSLI Technology, McGraw-Hill Book Company.

FIG. 3 depicts an example of the above-described method for patterning an air-bearing surface of a plurality of sliders provided in the form of the slider assembly depicted in FIG. 2. As shown in FIG. 3A, the slider assembly 24 is placed on a flat surface such that the air-bearing surface 28 of the assembly faces upward and the carrier 30 contacts the flat surface. A photoresist layer 32 is applied in a uniform thickness over the air-bearing surface. Due to the planarization of air-bearing surface 28, the resist layer may be applied as a thin, high-resolution coating. Planarized surfaces have been coated with resist layers having a preferred thickness of about 1 to 25 micrometers and a more preferred thickness of about 2.0 to 15 micrometers. This provides a resolution of about 200 micrometers to 5 micrometers.

Figure 3A:
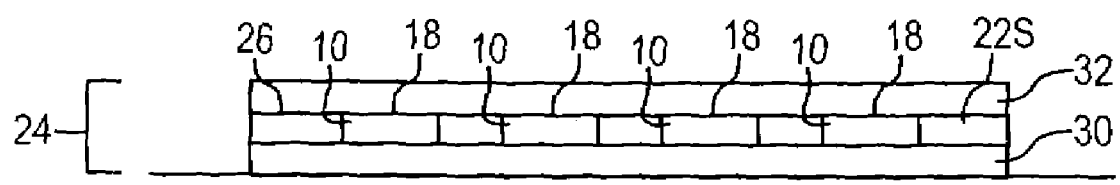
FIGS. 3A–3E, collectively referred to as FIG. 3, depict an example of a method for photolithographically patterning an air-bearing surface of a plurality of sliders provided in the form of the slider assembly depicted in FIG. 2.
Figure 3B:
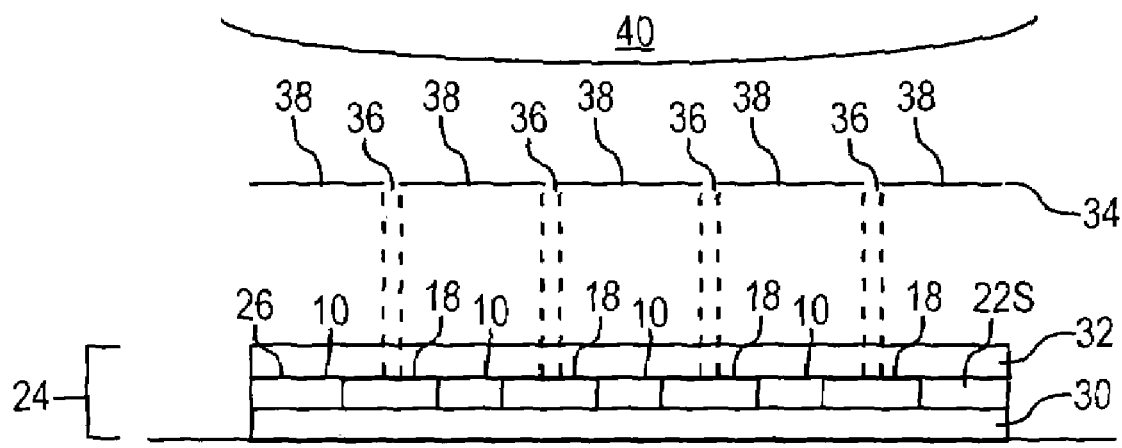

FIG. 3B depicts the patternwise exposure of the photoresist layer 32 to photons. This is performed by providing a mask 34 having transparent regions 36 and opaque regions 38. A source 40 of photons is provided in order to generate radiation, preferably substantially collimated, having a wavelength to which the photoresist layer 32 is responsive. Typically, the wavelength is an ultraviolet wavelength. The mask 34 is placed between the photon source 40 and the photoresist layer 32 such that the transparent regions 36 are in alignment with the air-bearing surfaces 18 of the sliders 10. As a result, radiation is transmitted through the transparent regions 36 of the mask 34, and the photoresist layer is converted into a patterned layer comprising the exposed and the unexposed regions. In some instances, grayscale masks are employed.

Figure 3C:
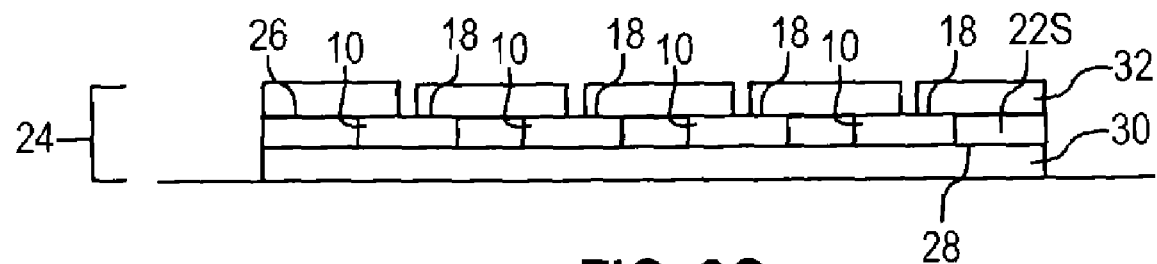

FIG. 3C depicts the removal of a resist layer according to the pattern formed in FIG. 3B. This is achieved by developing the exposed portions of the photoresist layer 32 to facilitate removal thereof. In this case, the exposed portions are washed away with a solvent, leaving the unexposed portions intact. As a result, portions of the air-bearing surfaces 18 are uncovered.

Figure 3D:
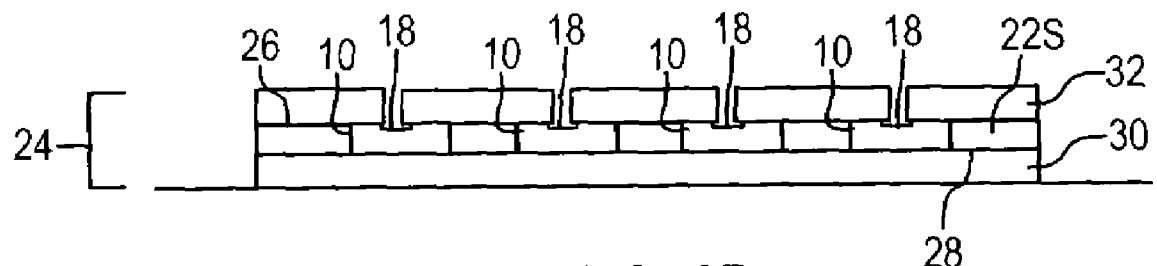
Figure 3E:
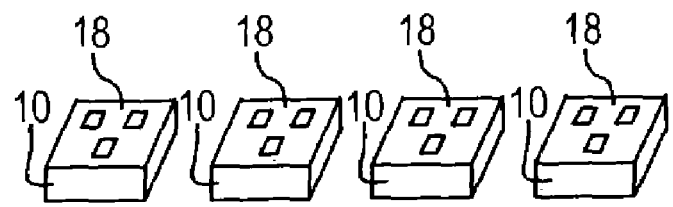

FIG. 3D depicts the removal of material from the uncovered slider surfaces 18 by exposing the surfaces 18 to an etchant. By debonding the encapsulant 22S from the sliders, as depicted in FIG. 3E, encapsulant free sliders 10, having patterned air-bearing surfaces 18, are formed. As discussed above, debonding may involve using a solvent to wash away the encapsulant or applying heat to liquefy, vaporize and/or discompose the encapsulant. Mechanical action may also be used sparingly to assist in the debonding process. For example, soft brushes may be used in conjunction with a solvent to remove encapsulant from the sliders so that no residue is left behind.

Encapsulant Fluids and Debondable Encapsulants

The selection of encapsulant fluids and debondable encapsulants represents a particularly important aspect of the invention. As discussed above, the encapsulant fluids are selected for their ability to gap-fill and to form slider arrays having high planarization values. However, encapsulant fluids having a desirable gap-filling capability tend to form encapsulants having poor debonding performance. Thus, while a number of encapsulant materials have been investigated, only a relative few have been found to exhibit both excellent gap-filling capabilities and bonding/debonding performance.

Styrene polymer blends represent a class of encapsulant material found suitable for use with the present invention. In particular, it has been demonstrated that a blend of low molecular weight polystyrene copolymers and polybutadiene can be used to form a readily debondable encapsulant. In encapsulant fluid form, such polymeric blends exhibit excellent gap-filling performance and planarization ability as well as exceptional debondability. While not wish to be bound by theory, it is believed that the facile debonding is attributed to the observation that the blend is thermoplastic rather than thermosetting.

A variety of low molecular weight hydrogenated styrene copolymers available from either ExxonMobile Chemical Company (Houston, Tex.) or Arakawa Forest Chemical Industries, Ltd. Corporation (Osaka, Japan) have been studied. These materials are amorphous, soluble in nonpolar solvents and are available with softening points ranging from 70–150° C., preferably at least 130° C. The viscosities at the softening points made solventless filling of the arrays difficult. In addition, the pure resins tended to fracture upon cooling at a thickness of several micrometers. To overcome such a drawback, it has been found that blending polybutadiene having a molecular weight of about 4000 to about 8000 Daltons with the hydrocarbon resins produces a significantly tougher material that is not prone to cracking.

The blends were dissolved (30–50 wt %) in nonpolar solvents such as mesitylene to form a solution to fill the gaps of a slider array. Because of the decreased solids content in the solution, multiple fillings were often used.

After each filling, the array was baked at 140° C. to remove the residual solvent before another coat was applied. The best results were achieved using styrene polymer resins with softening points above 130° C. Such resins are available under the Trademarks Arkon® 135 and Arkon® 140, registered to Arakawa Forest Chemical Industries, Ltd. Corporation (Osaka, Japan). Blends containing styrene and butadiene polymers in a weight ratio of about 19:1 to about 17:3 exhibited markedly improved performance. Another preferred weight ratio is about 9:1. Optimal performance was found in blends that contain about 10% of polybutadiene. Increasing quantities of polybutadiene further improved the toughness and filling characteristics, but increased the solubility of the encapsulant formed thereby in common polar organic solvents (e.g. propylene glycol methyl ether acetate).

The debonding performance was preliminarily evaluated by rubbing a film of the blend in a polar solvent to simulate the brush action that may be used in a debonding technique. Then, solutions contain the polymer blend at 44 wt % solutions were used to fill the five by nineteen rectilinear arrays for forming a slider assembly. These were subjected to a standard photolithographic patterning process that uses propylene glycol methyl ether acetate. The use of propylene glycol methyl ether acetate often led to step heights in excess of 5 microns after removal of the tape. Alternative solvents such as ethyl lactate and isopropanol were substituted in standard process and all step heights returned to less than 5 micrometers. After completion of the patterning process, the sliders were cleanly debonded using mesitylene at 50° C. with sonication. Careful microscopic examination of the sliders showed that the blend polymer had been completely removed, which represents a substantial improvement over that debonding performance of epoxy resin.

It should be noted that the bonding and debonding performance of an encapsulant is dependent on a variety of factors and is not generally predicable solely based on the chemical structure of the encapsulant. Thus, for example, while certain members of a class of polymers may exhibit acceptable bonding and debonding performance, other members of the same class are not. Thus, when a class of polymers is generally identified as exhibiting acceptable bonding/debonding performance, specific polymers within that class which suffer from poor bonding and/or debonding performance is specifically excluded by the invention. For example, while the polymer discussed above have generally found to exhibit acceptable bonding/debonding performance, it is expected that not all such polymers can be used to form a debondable encapsulant. According, employment of such unsuitable polymers in an encapsulant is not encompassed by the invention.

It is to be understood that while the invention has been described in conjuction with the preferred specific embodiments thereof, the foregoing description is intended to illustrate and not limit the scope of the invention. Other aspects, advantages and modifications will be apparent to those skilled in the art to which the invention pertains. All patents and publications cited herein are incorporated by reference in their entireties.

We claim:

1. A slider assembly comprising a plurality of sliders for a data storage system bonded by a debondable solid encapsulant, wherein the encapsulant is comprised of a blend of styrene and butadiene polymers, of a weight ratio of about 19:1 to about 17:3, or about 9:1, or about 10% polybutadiene, wherein at least some sliders have encapsulant-free surfaces which are coplanar to each other.

2. The slider assembly of claim 1, having a contiguous planar surface comprised of at least one encapsulant region and containing the coplanar slider surfaces.

3. The slider assembly of claim 2, wherein the sliders are arranged in an array.

4. The slider assembly of claim 3, wherein the array is a rectilinear array.

5. The slider assembly of claim 4, wherein the sliders do not contact each other.

6. The slider assembly of claim 4, wherein the coplanar surfaces of the sliders are each an air-bearing surface.

7. The slider assembly of claim 6, further comprising a substrate in contact with the air-bearing surfaces.

8. The slider assembly of claim 7, wherein the substrate is comprised of a laminate of a flexible tape and an adhesive, wherein the adhesive is in contact with the air-bearing surfaces.

9. The slider assembly of claim 8, wherein the adhesive is a pressure sensitive adhesive.

10. The slider assembly of claim 8, wherein the adhesive preferentially adheres to the tape over the air-bearing surfaces.

11. The slider assembly of claim 6, further comprising a resist layer on the air-bearing surfaces, wherein the encapsulant is mechanically stable upon exposure to the resist layer or any component thereof.

12. The slider assembly of claim 11, wherein the encapsulant is subject to solvation by a solvent not found in the resist layer.

13. The slider assembly of claim 4, wherein the encapsulant does not substantially outgas under vacuum.

14. The slider assembly of claim 4, further comprising a carrier attached to the encapsulant and/or at least one slider, wherein the carrier does not cover any of the coplanar slider surfaces.

15. The slider assembly of claim 4, wherein the styrene and butadiene polymers are present is a weight ratio of about 19:1 to about 17:3.

16. The slider assembly of claim 15, wherein the styrene and butadiene polymers are present in a weight ratio of about 9:1.

17. The slider assembly of claim 1, wherein the encapsulant blend provides markedly improved performance, with improved toughness and filling characteristics.

* * * * *